(12) United States Patent
Watano et al.

(10) Patent No.: US 12,504,643 B2
(45) Date of Patent: Dec. 23, 2025

(54) OPTICAL LAMINATE, METHOD OF MANUFACTURING PATTERNED OPTICAL ANISOTROPIC LAYER, 3D IMAGE DISPLAY APPARATUS, AND 3D IMAGE DISPLAY

(71) Applicant: FUJIFILM Corporation, Tokyo (JP)

(72) Inventors: Akiko Watano, Kanagawa (JP); Hajime Nakayama, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 790 days.

(21) Appl. No.: 17/673,458

(22) Filed: Feb. 16, 2022

(65) Prior Publication Data

US 2022/0171212 A1   Jun. 2, 2022

Related U.S. Application Data

(63) Continuation of application No. PCT/JP2020/031236, filed on Aug. 19, 2020.

(30) Foreign Application Priority Data

Aug. 23, 2019   (JP) .................... 2019-152849

(51) Int. Cl.
*G02B 30/25* (2020.01)
*G02F 1/1335* (2006.01)
*H10K 59/80* (2023.01)

(52) U.S. Cl.
CPC ....... *G02B 30/25* (2020.01); *G02F 1/133541* (2021.01); *H10K 59/8791* (2023.02)

(58) Field of Classification Search
CPC ..... G02B 30/25; G02B 5/30; G02F 1/133541; H10K 59/8791; H04N 13/337; G09F 9/00; H05B 33/02
See application file for complete search history.

(56) References Cited

U.S. PATENT DOCUMENTS

2013/0083276 A1   4/2013   Iwahashi et al.
2013/0100367 A1   4/2013   Takahashi et al.
(Continued)

FOREIGN PATENT DOCUMENTS

JP   2012-008170 A   1/2012
JP   2012-014064 A   1/2012
(Continued)

OTHER PUBLICATIONS

International Search Report issued in PCT/JP2020/031236 on Oct. 27, 2020.
(Continued)

*Primary Examiner* — Jennifer D. Carruth
*Assistant Examiner* — Agnes Dobrowolski
(74) *Attorney, Agent, or Firm* — Edwards Neils LLC; Jean C. Edwards, Esq.

(57) ABSTRACT

Provided are an optical laminate in which crosstalk during 3D image observation is suppressed where the optical laminate is applied to a high-definition display panel, a 3D image display apparatus and system. The optical laminate includes: a patterned optical anisotropic layer; and a polarizing film, in which the patterned optical anisotropic layer includes first and second phase difference regions having different in-plane slow axis directions and includes a boundary region positioned between the first and second phase difference regions, the first and second phase difference regions are alternately disposed in a first direction and second direction perpendicular to the first direction, in the same plane, a width of the boundary region is 20 μm or less, and an average interval between corner portions of adjacent regions as a phase difference region having a smaller area among the first and second phase difference regions is 60 μm or less.

7 Claims, 5 Drawing Sheets

(56) References Cited

U.S. PATENT DOCUMENTS

| | | | | |
|---|---|---|---|---|
| 2013/0286329 A1* | 10/2013 | Goto | ............... | G02B 5/3016 |
| | | | | 349/194 |
| 2014/0233000 A1 | 8/2014 | Fukuda | | |
| 2020/0319496 A1* | 10/2020 | Son | ............... | G02F 1/13394 |

FOREIGN PATENT DOCUMENTS

| | | | | |
|---|---|---|---|---|
| JP | 2012-042530 A | 3/2012 | | |
| JP | 2012-108465 A | 6/2012 | | |
| JP | 2012-150428 A | 8/2012 | | |
| JP | 2013-213885 A | 10/2013 | | |
| JP | 2014-153526 A | 8/2014 | | |
| WO | WO-2015008850 A1 * | 1/2015 | ............ | G02B 27/26 |
| WO | 2020/090522 A1 | 5/2020 | | |

OTHER PUBLICATIONS

Written Opinion issued in PCT/JP2020/031236 on Oct. 27, 2020.
International Preliminary Report on Patentability completed by WIPO on Feb. 17, 2022 in connection with International Patent Application No. PCT/JP2020/031236.
Office Action, issued by the Japanese Patent Office on Jan. 31, 2023, in connection with Japanese Patent Application No. 2021-542781.

* cited by examiner

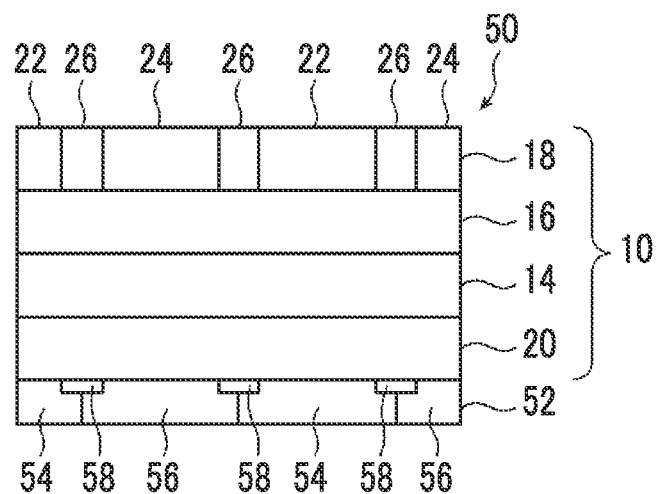
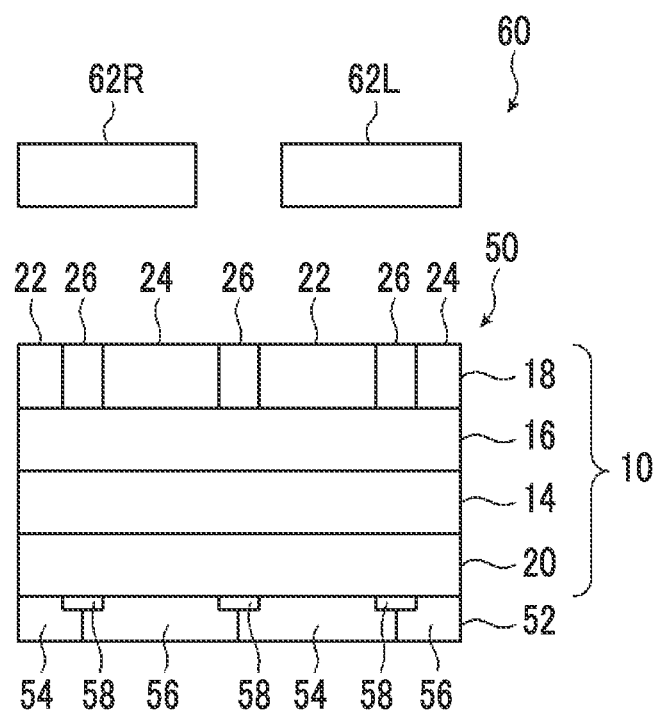

OPTICAL LAMINATE, METHOD OF MANUFACTURING PATTERNED OPTICAL ANISOTROPIC LAYER, 3D IMAGE DISPLAY APPARATUS, AND 3D IMAGE DISPLAY

CROSS-REFERENCE TO RELATED APPLICATIONS

This application is a Continuation of PCT International Application No. PCT/JP2020/031236 filed on Aug. 19, 2020, which was published under PCT Article 21(2) in Japanese, and which claims priority under 35 U.S.C. § 119 (a) to Japanese Patent Application No. 2019-152849 filed on Aug. 23, 2019. The above applications are hereby expressly incorporated by reference, in their entirety, into the present application.

BACKGROUND OF THE INVENTION

1. Field of the Invention

The present invention relates to an optical laminate, a method of manufacturing a patterned optical anisotropic layer, a 3D image display apparatus, and a 3D image display system.

2. Description of the Related Art

In a 3D image display apparatus that displays a 3D (stereoscopic) image, for example, an optical member for converting a right eye image and left eye image into circularly polarized images in opposite directions is required. As this optical member, for example, a patterned optical anisotropic element in which regions having different slow axes, retardations, or the like are regularly disposed in a plane is used. As a support of the patterned optical anisotropic element, a so-called film patterned retarder type patterned retardation film (FPR film) using a film is also proposed. A patterned optical anisotropic layer having a stripe pattern is generally used.

Incidentally, regarding visual performance of human eyes, the cognition in the horizontal and vertical directions are high, and the cognition in an oblique direction is relatively low. Therefore, it is known that, even with the same number of pixels, a pattern that is obliquely disposed has a higher apparent resolution (image sensor technique and its implementation strategy (2013, published by Tokyo Denki University Press).

JP2012-150428A discloses a configuration in which a first phase difference region and a second phase difference region having different in-plane slow axis directions are arranged in a lattice as an optically-anisotropic layer having a high-definition alignment pattern.

SUMMARY OF THE INVENTION

According to an investigation by the present inventors, it was found that, in a case where an optical laminate including the patterned optical anisotropic layer having the configuration in which the first phase difference region and the second phase difference region are arranged in a lattice is used in a 3D image display apparatus, there is a problem in that crosstalk occurs.

The present invention has been made in consideration of the above-described circumstances, and an object thereof is to provide an optical laminate in which crosstalk during 3D image observation is suppressed even in a case where the optical laminate is applied to a high-definition display panel, a method of manufacturing a patterned optical anisotropic layer, a 3D image display apparatus, and a 3D image display system.

In order to achieve the object, the present invention has the following configurations.

(1) An optical laminate comprising:
a patterned optical anisotropic layer, and
a polarizing film,
in which the patterned optical anisotropic layer includes a first phase difference region and a second phase difference region having different in-plane slow axis directions and includes a boundary region positioned at a boundary between the first phase difference region and the second phase difference region,
the first phase difference region and the second phase difference region are alternately disposed in a first direction and a second direction perpendicular to the first direction, respectively, in the same plane,
an average width of the boundary region is 20 m or less, and
an average interval between corner portions of adjacent regions as a phase difference region having a smaller area among the first phase difference region and the second phase difference region is 60 μm or less.

(2) The optical laminate according to (1),
in which a total thickness of the optical laminate is 6 μm to 80 μm.

(3) The optical laminate according to (1) or (2),
in which the polarizing film consists of a light absorption anisotropic film that is formed of a composition including a dichroic substance and a liquid crystal compound.

(4) The optical laminate according to any one of (1) to (3),
in which the first phase difference region and the second phase difference region are alternately disposed in an absorption axis direction and a transmission axis direction of the polarizing film, respectively.

(5) The optical laminate according to any one of (1) to (4),
in which the in-plane slow axis direction of the first phase difference region and the in-plane slow axis direction of the second phase difference region are perpendicular to each other, and
angles of the in-plane slow axis direction of the first phase difference region and the in-plane slow axis direction of the second phase difference region with respect to an absorption axis direction of the polarizing film are 43° to 47°.

(6) The optical laminate according to any one of (1) to (5),
in which an in-plane retardation Re(550) of each of the first phase difference region and the second phase difference region at a wavelength of 550 nm is 110 nm to 165 nm.

(7) The optical laminate according to any one of (1) to (6),
in which the first phase difference region and the second phase difference region are formed of a composition including a discotic liquid crystal having a polymerizable group as a major component.

(8) A method of manufacturing a patterned optical anisotropic layer including the optical laminate according to any one of (1) to (7), the method comprising, in the following order:
an alignment film application step of applying a coating solution for forming an alignment film to a substrate to form a coating film;
an exposure step of performing pattern exposure on the coating film formed on the substrate using an exposure mask;

a rubbing step of rubbing the coating film on which the pattern exposure is performed to form the alignment film; and a composition application step of applying a composition for forming the patterned optical anisotropic layer to the alignment film, in which in the exposure step, the exposure mask and the coating film are closely attached to each other and are pressed at a pressure of 0.03 MPa to 0.7 MPa for the exposure.

(9) A 3D image display apparatus comprising:

a display panel that is driven based on an image signal; and the optical laminate according to any one of (1) to (7) that is disposed on a visible side of the display panel, in which the optical laminate is disposed such that the polarizing film side faces the display panel.

(10) A 3D image display system comprising:

the 3D image display apparatus according to (9); and a right circular polarization plate and a left circular polarization plate that are disposed on a visible side of the 3D image display apparatus, in which a stereoscopic image is seen through the right circular polarization plate and the left circular polarization plate.

According to the present invention, it is possible to provide an optical laminate in which crosstalk during 3D image observation is suppressed even in a case where the optical laminate is applied to a high-definition display panel, a method of manufacturing a patterned optical anisotropic layer, a 3D image display apparatus, and a 3D image display system.

BRIEF DISCRETION OF THE DRAWINGS

Figure 2:
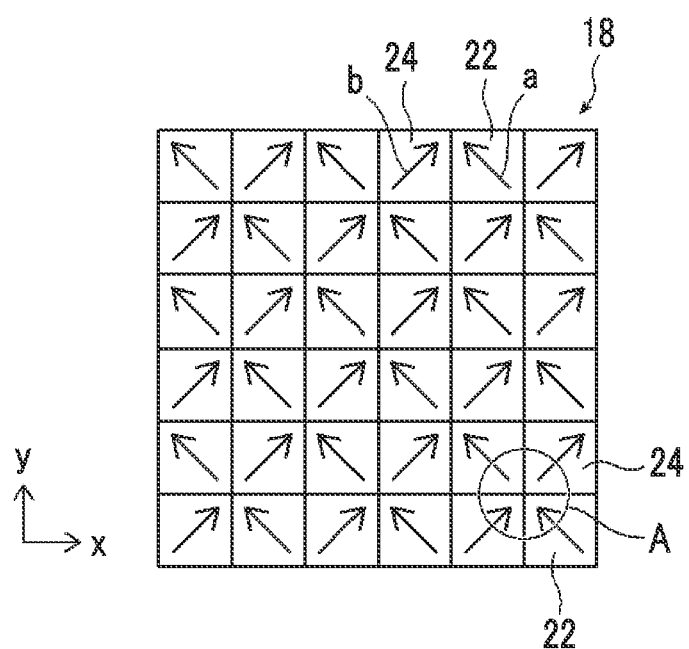
FIG. 2 is a top view showing a patterned optical anisotropic layer of the optical laminate shown in FIG. 1.
Figure 3:
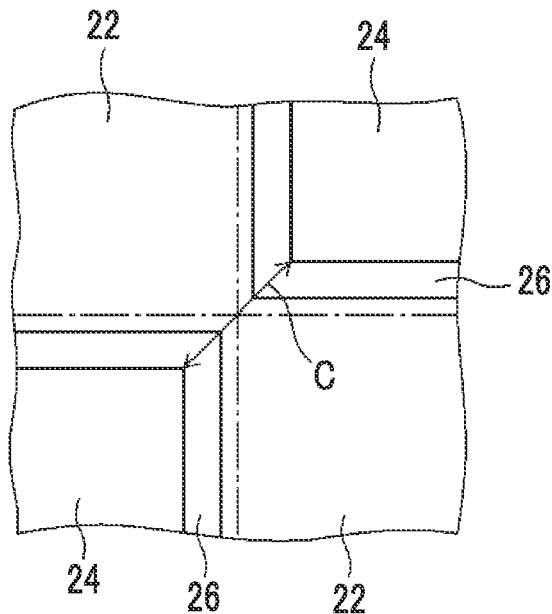

FIG. 3 a partially enlarged view showing a region indicated by A in FIG. 2.

Figure 4:
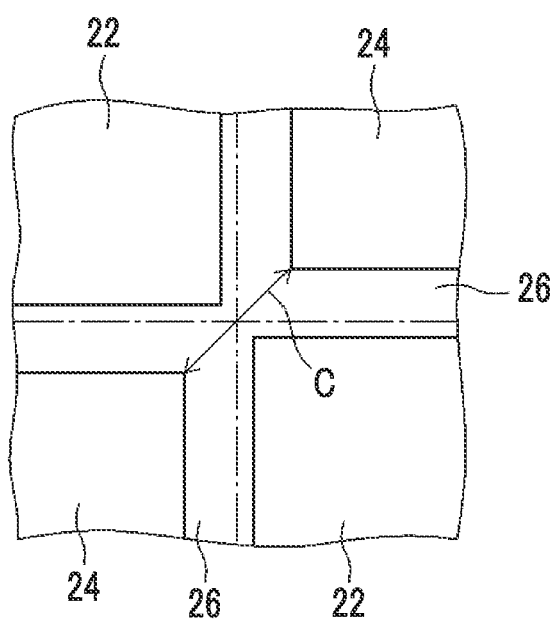

FIG. 4 is a partially enlarged view showing another example of the patterned optical anisotropic layer.

Figure 5:
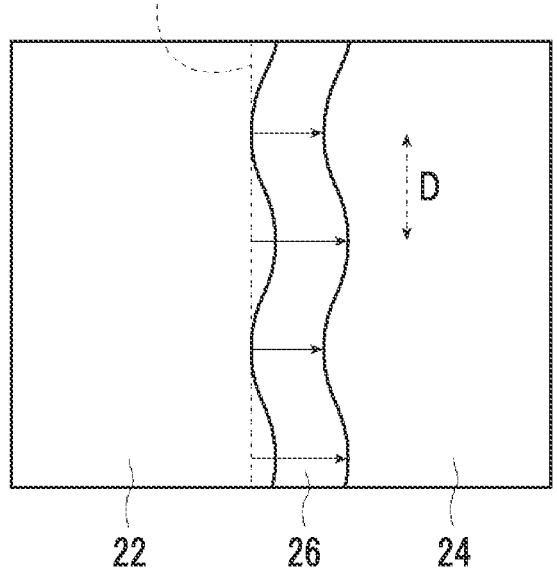

FIG. 5 is a schematic diagram showing a method of measuring the width of a boundary line.

Figure 6:
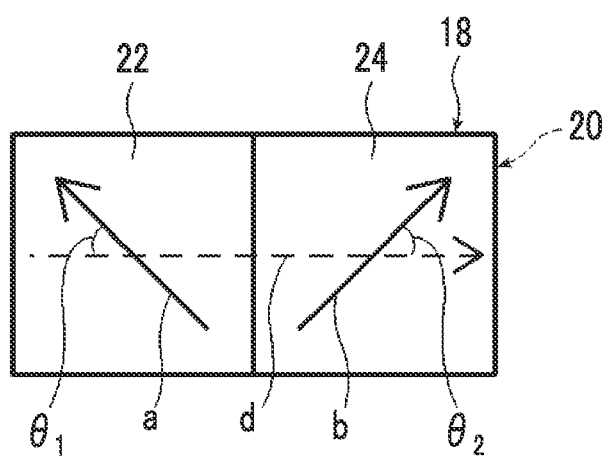

FIG. 6 is a schematic diagram showing an example of a relationship between an in-plane slow axis of the patterned optical anisotropic layer and a transmission axis of a polarizing film.

Figure 7:
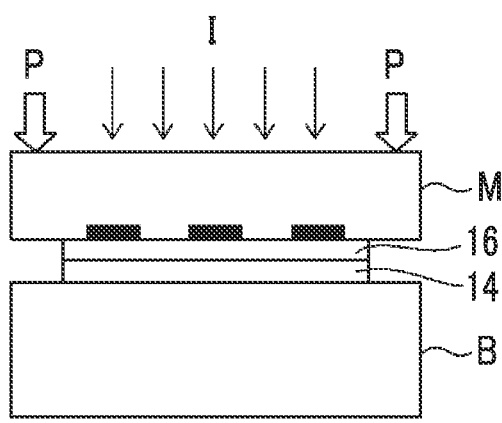

FIG. 7 is a schematic diagram showing an exposure step in a method of manufacturing the patterned optical anisotropic layer according to the present invention.

FIG. 8 is a cross-sectional view schematically showing an example of a 3D image display apparatus according to the present invention.

FIG. 9 is a cross-sectional view schematically showing an example of a 3D image display system according to the present invention.

Figure 10:
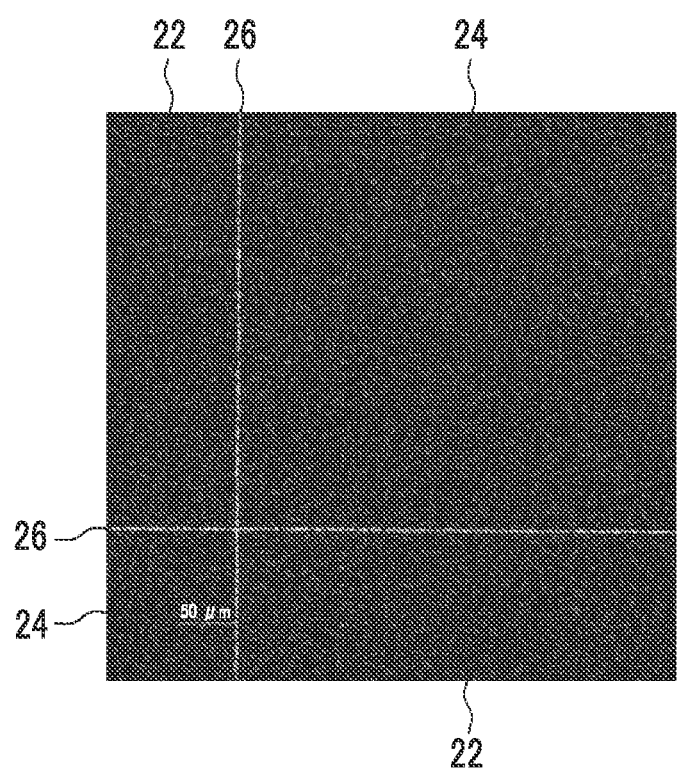

FIG. 10 is a micrograph showing a patterned optical anisotropic layer prepared in Example 5.

DESCRIPTION OF THE PREFERRED EMBODIMENTS

Hereinafter, the details of the present invention will be described. In the present specification, numerical ranges represented by "to" include numerical values before and after "to" as lower limit values and upper limit values.

In addition, in the present specification, an angle (for example, an angle such as "90°") and a relationship thereof (for example, "perpendicular", "parallel", or "intersecting at 45°") are in a range including errors which are generally allowable in the technical field to which the present invention belongs. For example, an angle is in a range of the exact angle±less than 10°, and the error from the exact angle is preferably 5° or less and more preferably 3° or less.

In the present invention, $Re(\lambda)$ and $Rth(\lambda)$ represent an in-plane retardation and a thickness-direction retardation at a wavelength $\lambda$, respectively. Unless specified otherwise, the wavelength $\lambda$ refers to 550 nm.

In the present invention, $Re(\lambda)$ and $Rth(\lambda)$ are values measured at the wavelength $\lambda$ using AxoScan OPMF-1 (manufactured by Opto Science Inc.). By inputting an average refractive index $((n_x+n_y+n_z)/3)$ and a thickness (d (μm)) to AxoScan, the following expressions can be calculated.

Slow Axis Direction (°)

$Re(\lambda)=R0(\kappa)$ $Rth(\lambda)=((n_x+n_y)/2-n_z)\times d$ $R0(\lambda)$ is expressed as a numerical value calculated by AxoScan OPMF-1 and represents $Re(\lambda)$.

The average refractive index used in AxoScan is measured using an Abbe refractometer (NAR-4T, manufactured by Atago Co., Ltd.), and a sodium lamp ($\lambda$=589 nm) is used as a light source. In addition, the wavelength dependence can be measured using a combination of a multi-wavelength Abbe refractometer DR-M2 (manufactured by Atago Co., Ltd.) and an interference filter.

In addition, as the refractive index, values described in "Polymer Handbook" (John Wiley&Sons, Inc.) and catalogs of various optical films can also be used. The values of average refractive index of major optical films are as follows: cellulose acylate (1.48), cycloolefin polymer (1.52), polycarbonate (1.59), polymethyl methacrylate (1.49), and polystyrene (1.59).

In addition, in the present application, each of the drawings is a schematic diagram so as to easily understand a relationship between the respective components for the description, and a dimensional ratio therebetween is not the most appropriate one. A preferable range of a dimensional ratio or the like between the respective components will be described below.

[Optical Laminate]

An optical laminate according to an embodiment of the present invention comprises:

a patterned optical anisotropic layer; and a polarizing film, in which the patterned optical anisotropic layer includes a first phase difference region and a second phase difference region having different in-plane slow axis directions and includes a boundary region positioned at a boundary between the first phase difference region and the second phase difference region, the first phase difference region and the second phase difference region are alternately disposed in a first direction and a second direction perpendicular to the first direction, respectively, in the same plane, a width of the boundary region is 20 μm or less, and an average interval between corner portions of adjacent regions as a phase difference region having a smaller area among the first phase difference region and the second phase difference region is 60 μm or less.

The optical laminate according to the embodiment of the present invention will be described using the drawings.

Figure 1:
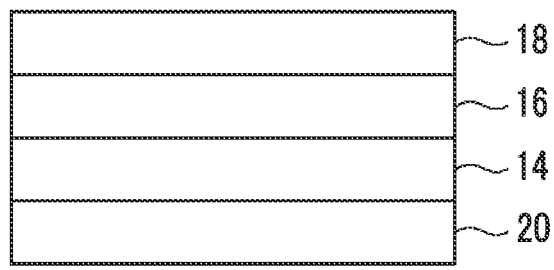
FIG. 1 is a cross-sectional view schematically showing an example of an optical laminate according to the present invention.

FIG. 1 is a cross-sectional view schematically showing an example of the optical laminate according to the embodiment of the present invention, and FIG. 2 is a top view showing the patterned optical anisotropic layer of the optical laminate shown in FIG. 1.

An optical laminate 10 shown in FIG. 1 includes a polarizing film 20, a transparent support 14, an alignment film 16, and a patterned optical anisotropic layer 18 in this order.

As shown in FIG. 2, the patterned optical anisotropic layer 18 has a configuration in which a first phase difference region 22 and a second phase difference region 24 having different in-plane slow axis directions indicated by arrows a and b in FIG. 2 are alternately disposed in an up-down direction and a left-right direction in FIG. 2 in the same plane. Hereinafter, the directions in which the first phase difference region 22 and the second phase difference region 24 are alternately arranged will be referred to as "x direction" and "y direction". The x direction and the y direction are the first direction and the second direction in the present invention. In addition, in the following description, the configuration in which the first phase difference region 22 and the second phase difference region 24 are alternately arranged in the x direction and the y direction will also be referred to as "lattice pattern".

In the optical laminate 10, light incident from the polarizing film 20 side is converted into linearly polarized light by the polarizing film 20, and the linearly polarized light is converted into circularly polarized light by the first phase difference region 22 and the second phase difference region 24 of the patterned optical anisotropic layer 18. In this case, the first phase difference region 22 and the second phase difference region 24 have different in-plane slow axis direction. Therefore, a turning direction of the circularly polarized light converted by the first phase difference region 22 and a turning direction of the circularly polarized light converted by the second phase difference region 24 are different from each other.

For example, by disposing the optical laminate 10 on a visible side of a display panel such that light of a right eye image that is displayed by the display panel transmits through the first phase difference region 22 and light of a left eye image that is displayed by the display panel transmits through the second phase difference region 24. As a result, the light of the right eye image and the light of the left eye image can be converted into circularly polarized light components having different turning directions. Among the circularly polarized light components transmitted through the first phase difference region 22 and the second phase difference region 24, one circularly polarized light component is seen as the right eye image and another circularly polarized light component is seen as the left eye image through a circular polarization plate such as polarized glasses. As a result, an observer can see a stereoscopic image (three-dimensional (3D) image).

<Polarizing Film>

The polarizing film is not particularly limited as long as it is a member having a function of converting natural light into specific linearly polarized light. For example, an absorbing polarizer can be used.

The kind of the polarizing film is not particularly limited, and a typically used polarizing film can be used. For example, any of an iodine-containing polarizing film, a dye-containing polarizing film using a dichroic dye, or a polyene-containing polarizing film can be used. The iodine-containing polarizing film or the dye-containing polarizing film can be generally prepared by adsorbing iodine or a dichroic dye to polyvinyl alcohol and stretching the film.

In particular, it is preferable that the polarizing film consists of a light absorption anisotropic film that is formed of a composition including a dichroic substance and a liquid crystal compound. By using the application type polarizing film formed of the composition including a dichroic substance and a liquid crystal compound, the thickness of the polarizing film can be reduced, and the total thickness of the optical laminate can be reduced.

The application type polarizing film formed of the composition including a dichroic substance and a liquid crystal compound can refer to a linear polarizing layer described in JP2012-108465A.

In general, the polarizing film is used as a polarizing plate having both surfaces to which a protective film is bonded.

It is preferable that the polarizing film is bonded to another layer directly or through an adhesive layer or a pressure sensitive adhesive layer. In the example shown in FIG. 1, the polarizing film 20 is bonded to the transparent support 14.

In order to improve adhesiveness between the polarizing film 20 and the transparent support 14, it is preferable to perform a surface treatment (for example, a glow discharge treatment, a corona discharge treatment, a plasma treatment, an ultraviolet (UV) treatment, a flame treatment, a saponification treatment, solvent cleaning) on a surface of the transparent support 14.

The pressure sensitive adhesive layer refers to, for example, a material in which a ratio (tan $\delta$=G"/G') between a storage elastic modulus G' and a loss elastic modulus G" measured by a dynamic viscoelasticity measuring device is 0.001 to 1.5, and examples thereof include a so-called pressure sensitive adhesive and a material that is likely to creep. Examples of the pressure sensitive adhesive that can be used in the present invention include a polyvinyl alcohol pressure sensitive adhesive, but the pressure sensitive adhesive is not limited thereto.

<Patterned Optical Anisotropic Layer>

As described above, the patterned optical anisotropic layer 18 has a configuration in which the first phase difference region 22 and the second phase difference region 24 having different in-plane slow axis directions are arranged in the lattice pattern. In addition, the patterned optical anisotropic layer 18 includes a boundary region 26 positioned at a boundary between the first phase difference region 22 and the second phase difference region 24.

Each of the first phase difference region 22 and the second phase difference region 24 is a region having refractive index anisotropy in a plane and imparts phase difference to incident light.

In the example shown in FIG. 2, the first phase difference region 22 and the second phase difference region 24 includes in-plane slow axes (arrows a and b in FIG. 2) perpendicular to each other, respectively.

The boundary region 26 is different from the first phase difference region 22 and the second phase difference region 24 and is a region where the liquid crystal compound does not form uniform alignment, which causes light leak.

Here, in the present invention, the width of the boundary region 26 is 20 µm or less. The boundary region 26 causes light leak. Therefore, by adjusting the width of the boundary region 26 to be 20 µm or less, light leak can be suppressed, and crosstalk can be suppressed. From the viewpoint of suppressing crosstalk, it is preferable that the width of the boundary region 26 is as small as possible. However, from the viewpoint of productivity or the like, it is difficult to adjust the width of the boundary region 26 to 0. Accordingly, the width of the boundary region 26 is preferably 3 μm to 20 μm, more preferably 3 μm to 12 μm, and still more preferably 3 μm to 8 μm.

In addition, in the present invention, an average interval between corner portions of adjacent regions as a phase difference region having a smaller area among the first phase difference region and the second phase difference region is 60 μm or less.

This point will be described using FIGS. 3 and 4.

FIG. 3 is an enlarged view showing a region indicated by A in the patterned optical anisotropic layer 18 shown in FIG. 2. FIG. 3 is an enlarged view showing a region where corner portions of four phase difference regions are adjacent to each other. In addition, in FIG. 3, one chain line is a line indicating a boundary between pixels of the display panel where the optical laminate is disposed.

In the optical laminate 10, it is ideal that the first phase difference region 22 and the second phase difference region 24 of the patterned optical anisotropic layer 18 are formed in the same shape and size as those of the pixels of the display panel indicated by the chain line. However, as described above, the boundary region 26 is formed between the first phase difference region 22 and the second phase difference region 24. In addition, it is difficult to form the first phase difference region 22 and the second phase difference region 24 in completely the same size. As shown in FIG. 3, the first phase difference region 22 and the second phase difference region 24 are formed in different sizes. In FIG. 3, the first phase difference region 22 is larger than the second phase difference region 24.

In a case where the first phase difference region 22 is larger than the second phase difference region 24, for example, as shown in FIG. 3, first phase difference regions 22 of which corner portions are adjacent to each other are connected to each other through the corner portions. On the other hand, the boundary region 26 and the first phase difference region 22 are present between corner portions of the second phase difference regions 24 having a smaller area. Therefore, an interval C between the corner portions of the second phase difference regions adjacent to each other is large. In a case where the interval C between the corner portions is large, light leak increases such that crosstalk occurs.

In addition, as shown in FIG. 3, in a case where the corner portions of the first phase difference regions 22 are connected to each other, the first phase difference region 22 may be present at a position of a pixel corresponding to the second phase difference region 24 although depending on the width of the boundary region 26. In a case where the first phase difference region 22 that protrudes to the position where the second phase difference region 24 should be present is present, light leak occurs such that crosstalk occurs. That is, light leak occurs due to not only the width of the boundary region 26 but also the width of the protruded first phase difference region 22 such that crosstalk occurs.

Alternatively, for example, as shown in FIG. 4, even in a case where the first phase difference regions 22 are not connected through the corner portions, the interval C between the corner portions of the second phase difference regions having a smaller area is larger than an interval between corner portions of the first phase difference regions having a larger area. In a case where the interval C between the corner portions is large, light leak increases such that crosstalk occurs.

In the present invention, the interval (average interval) C between the corner portions of the second phase difference regions having a smaller area is 60 μm or less. As a result, by reducing the width of the boundary region 26 and the protrusion amount of the first phase difference region 22, light leak can be suppressed such that the occurrence of crosstalk can be suppressed.

In a case where the areas of the first phase difference region 22 and the second phase difference region 24 are the same, the intervals between the corner portions of the regions are the same. Therefore, the intervals between the corner portions of both of the regions may be 60 μm or less.

From the viewpoint of suppressing light leak to suppress the occurrence of crosstalk, the average interval between the corner portions of adjacent regions as the phase difference region having a smaller area is preferably 4 μm to 60 μm, more preferably 4 μm to 30 μm, and still more preferably 4 μm to 10 μm.

The first phase difference region 22, the second phase difference region 24, and the boundary region 26 can be distinguished from each other by observation with a polarization microscope. For example, the patterned optical anisotropic layer (the patterned optical anisotropic layer in which the in-plane slow axis of the first phase difference region and the in-plane slow axis of the second phase difference region are perpendicular to each other) is provided on a sample stage of a polarization microscope (ECLIPE E600W POL) manufactured by NIKON Corporation) such that one in-plane slow axis of any one of the first phase difference region or the second phase difference region is parallel to one transmission axis of any one of the two polarizing plates combined such that the transmission axes are perpendicular to each other. In this case, the first phase difference region and the second phase difference region are displayed by black. On the other hand, the boundary region is a region where uniform alignment is not formed, and thus is displayed by white without shielding light. As a result, each of the regions can be specified.

In order to specify the boundary region, as described above, the polarization microscope is used to be parallel to one transmission axis of any one of the two polarizing plates combined such that the transmission axes are perpendicular to each other. As a generic procedure, the patterned optical anisotropic layer as a sample is disposed using the polarization microscope between the two polarizing plates combined such that the transmission axes are perpendicular to each other, the patterned optical anisotropic layer is rotated to be perpendicular to an optical axis in a plane, and an observation diagram of a state where the first phase difference region is displayed by black and an observation diagram of a state where the second phase difference region is displayed by black are compared to each other. The region displayed by white in both of the two observation diagrams corresponds to the boundary region.

The width of the boundary region is measured using image analysis software WinROOF (manufactured by Mitani Corporation) after inputting the image observed with the polarization microscope to a personal computer (PC) from a digital camera (NIKON DIGITAL CAMERA DXM1200) attached to the polarization microscope. In a specific measuring method, for example, in a case where the width of the boundary region is measured, the boundary region 26 is positioned near the center as shown in FIG. 5 during the observation with the polarization microscope. In this case, as shown in FIG. 5, a direction in which the boundary region 26 extends is the up-down direction during the observation. Next, in the observation diagram, a straight line X connecting apexes of two protrusion portions on the leftmost side among protrusion portions that protrude to the left of the boundary region 26 is drawn. Next, a line (arrow in the drawing) is drawn from a given point Y on the straight line X to a right side end portion of the boundary region 26 from the straight line X in a direction perpendicular to the straight line X, and the length of the line is calculated. The above-described length is calculated at 10 points at an interval of 50 µm (in the drawing, D is 50 µm) from the given point Y, and the average of the lengths obtained at 10 positions is obtained to obtain the width of the boundary region 26. Further, the above-described observation is performed at three positions of the patterned optical anisotropic layer, and the average of the widths of the boundary regions 26 obtained in the observation diagrams is obtained to obtain the average width of the boundary region.

The operation of drawing the straight line X and the measurement of the length from the straight line X to the right side end portion of the boundary region 26 are performed using WinROOF.

FIG. 5 shows an aspect where the boundary region 26 is meandering. However, the boundary region 26 is not limited to this aspect and may be linear.

The interval between the corner portions of the phase difference regions is measured using image analysis software WinROOF (manufactured by Mitani Corporation) after inputting the image observed with the polarization microscope to a PC from a digital camera (NIKON DIGITAL CAMERA DXM1200) attached to the polarization microscope. In a specific measuring method, the corner portions are positioned near the center as shown in FIGS. 3 and 4 during the observation with the polarization microscope. In this case, as shown in FIGS. 3 and 4, directions in which the boundary region extends are the up-down direction and the left-right direction during the observation. Next, in the observation diagram, the shortest distance between the corner portions of the phase difference regions is measured and set as "the interval C between the corner portions of the phase difference regions". The observation is performed at 10 positions of corner portions of the lattice pattern, and the average of "the intervals C between the corner portions of the phase difference regions" obtained in the observation diagrams is obtained to obtain "the average interval between the corner portions of the phase difference regions".

Here, it is preferable that the shapes of the first phase difference region 22 and the second phase difference region 24 are shapes corresponding to the shapes of pixels of the display panel. That is, it is preferable that the shapes of the first phase difference region 22 and the second phase difference region 24 are a substantially square shape or a substantially rectangular shape. In addition, it is preferable that the shapes of the first phase difference region 22 and the second phase difference region 24 are similar to each other.

Here, it is preferable that the x direction and the y direction in which the first phase difference region 22 and the second phase difference region 24 are alternately arranged are an absorption axis direction and a transmission axis direction of the polarizing film 20, respectively. That is, it is preferable that the x direction in FIG. 2 is the absorption axis direction of the polarizing film 20 and the y direction is the transmission axis direction or that the x direction is the transmission axis direction of the polarizing film 20 and the y direction is the absorption axis direction.

In addition, it is preferable that an angle of one of the in-plane slow axis of the first phase difference region 22 and the in-plane slow axis of the second phase difference region 24 with respect to the absorption axis of the polarizing film 20 is +45° and an angle of another one of the in-plane slow axis of the first phase difference region 22 and the in-plane slow axis of the second phase difference region 24 with respect to the absorption axis of the polarizing film 20 is −45°.

By setting the directions in which the first phase difference region 22 and the second phase difference region 24 are alternately arranged to be the absorption axis direction and the transmission axis direction of the polarizing film 20 and setting the angles of the in-plane slow axis of the first phase difference region 22 and the in-plane slow axis of the second phase difference region 24 with respect to the absorption axis of the polarizing film 20 to be −45° and +45°, right circularly polarized light and left circularly polarized light can be accurately realized. FIG. 6 is a diagram showing the above-described aspect and showing a relationship between an absorption axis d of the polarizing film 20 and the in-plane slow axes (a and b) of the patterned optical anisotropic layer 18. In FIG. 6, the angles of the in-plane slow axis a of the first phase difference region 22 and the in-plane slow axis b of the second phase difference region 24 in the patterned optical anisotropic layer 18 with respect to the absorption axis of the polarizing film 20 are 45° and −45°, respectively. The angles are not limited to 45° and −45°, may be 45°±10° and −45°±10°, and are preferably 43° to 47° and −43° to −47°.

In a case where the optical laminate is observed from the polarizing film side, the rotation angles of the in-plane slow axes are represented by a positive angle value in the clockwise direction and a negative angle value in the counterclockwise direction with respect to the absorption axis of the polarizing film.

In addition, FIG. 2 shows the configuration in which the first phase difference region 22 and the second phase difference region 24 includes in-plane slow axes perpendicular to each other, respectively. The angle between the in-plane slow axis of the first phase difference region 22 and the in-plane slow axis of the second phase difference region 24 is preferably 70° to 110°, more preferably 80° to 100°, and most preferably 90°.

Each of the in-plane retardations Re (550) of the first phase difference region 22 and the second phase difference region 24 at a wavelength of 550 nm is not particularly limited and is preferably 110 to 165 nm, more preferably 120 to 150 nm, and still more preferably 125 to 140 nm. Even in a case where the optical laminate includes another layer (for example, the transparent support) other than the patterned optical anisotropic layer, it is preferable that the in-plane retardations are in the above-described range in the entire optical laminate.

In addition, in a case where the optical laminate includes the transparent support described below, it is preferable that the sum of Rth of the transparent support and Rth of the patterned optical anisotropic layer satisfies |Rth|≤20 un. To that end, it is preferable that the transparent support satisfies −150 nm≤Rth(630)≤100 nm.

It is preferable that the patterned optical anisotropic layer includes a liquid crystal compound.

Examples of a method of forming the patterned optical anisotropic layer including the liquid crystal compound include a method of immobilizing the liquid crystal compound in the alignment state. In this case, a preferable method of immobilizing the liquid crystal compound include a method of using a liquid crystal compound having an unsaturated double bond (polymerizable group) as the above-described liquid crystal compound and immobilizing the liquid crystal compound by polymerization. For example, a method of applying a composition for forming the patterned optical anisotropic layer including the liquid crystal compound having an unsaturated double bond (polymerizable group) to the transparent support directly or through the alignment film and curing (polymerizing) the liquid crystal compound by irradiation of ionizing radiation to immobilize the liquid crystal compound can be used. The patterned optical anisotropic layer may have a monolayer structure or a laminate structure.

The kind of the unsaturated double bond in the liquid crystal compound is not particularly limited, and a functional group capable of an addition polymerization reaction is preferable, and a polymerizable ethylenically unsaturated group or a ring polymerizable group is preferable. More specifically, a (meth)acryloyl group, a vinyl group, a styryl group, or an allyl group is preferable, and a (meth)acryloyl group is more preferable.

In general, the liquid crystal compound can be classified into a rod-like type and a discotic type in terms of the shape. Further, the liquid crystal compound can also be classified into a low molecular weight type and a polymer type. In general, the polymer refers to a compound having a polymerization degree of 100 or higher (Polymer Physics-Phase Transition Dynamics, Masao Doi, page 2, Iwanami Shoten Publishers, 1992). In the present invention, any of the rod-like liquid crystal compound or the discotic liquid crystal compound (disk-like liquid crystal compound) can also be used. In addition, two or more rod-like liquid crystal compounds, two or more disk-like liquid crystal compounds, or a mixture of a rod-like liquid crystal compound and a disk-like liquid crystal compound may be used. In order to immobilize the liquid crystal compound, it is more preferable that the patterned optical anisotropic layer is formed of a rod-like liquid crystal compound or a disk-like liquid crystal compound having a polymerizable group, and it is still more preferable that the liquid crystal compound has two or more polymerizable groups in one molecule. In a case where the liquid crystal compound is a mixture of two or more kinds, it is preferable that at least one kind of liquid crystal compound has two or more polymerizable groups in one molecule.

Further, as the rod-like liquid crystal compound, for example, compounds described in claim 1 of JP1999-513019A (JP-H11-513019A) and paragraphs "0026" to "0098" of JP2005-289980A can be preferably used. As the discotic liquid crystal compound, for example, compounds described in paragraphs "0020" to "0067" of JP2007-108732A and paragraphs "0013" to "0108" of JP2010-244038A can be preferably used, but the present invention is not limited thereto.

In order to adjust the in-plane retardations in the patterned optical anisotropic layer to be in the above-described ranges, the alignment state of the liquid crystal compound may be controlled. In this case, in a case where the rod-like liquid crystal compound is used, it is preferable that the rod-like liquid crystal compound is immobilized in a state where it is horizontally aligned. In a case where the discotic liquid crystal compound is used, it is preferable that the discotic liquid crystal compound is immobilized in a state where it is vertically aligned. In the present invention, "the rod-like liquid crystal compound being horizontally aligned" represents that a director of the rod-like liquid crystal compound is parallel to a layer surface, and "the discotic liquid crystal compound being vertically aligned" represents that a disc plane of the discotic liquid crystal compound is perpendicular to a layer surface. The liquid crystal compound may be aligned in a range of the accurate angle±20° without being strictly horizontal or vertical. The range is preferably the accurate angle±5°, more preferably the accurate angle±3°, still more preferably the accurate angle±2°, and still more preferably the accurate angle±1°.

In addition, in order to horizontally or vertically align the liquid crystal compound, an additive (alignment control agent) that promotes the horizontal alignment or the vertical alignment may be used. As the additive, various well-known additives can be used.

A method of manufacturing the patterned optical anisotropic layer will be described below.

The thickness of the patterned optical anisotropic layer is not particularly limited and, from the viewpoint of further reducing the thickness of the optical laminate is preferably 0.1 to 10 μm and more preferably 0.1 to 5 μm.

<Transparent Support>

The optical laminate according to the embodiment of the present invention may include a layer other than the patterned optical anisotropic layer.

For example, the optical laminate may include the transparent support. That is, the optical laminate may be an aspect including: the transparent support; and the patterned optical anisotropic layer that is disposed on the transparent support. By including the transparent support, the mechanical strength of the optical laminate is improved.

Examples of a material for forming the transparent support include a polycarbonate polymer, a polyester polymer such as polyethylene terephthalate or polyethylene naphthalate, an acrylic polymer such as polymethyl methacrylate, a styrene polymer such as polystyrene or an acrylonitrile-styrene copolymer (AS resin), polyethylene, polypropylene, a polyolefin polymer such as an ethylene-propylene copolymer, a vinyl chloride polymer, an amide polymer such as nylon or an aromatic polyamide, an imide polymer, a sulfone polymer, a polyethersulfone polymer, a polyether ether ketone polymer, a polyphenylene sulfide polymer, a vinylidene chloride polymer, a vinyl alcohol polymer, a vinyl butyral polymer, an arylate polymer, a polyoxymethylene polymer, and an epoxy polymer.

In addition, as a material for forming the transparent support, a thermoplastic norbornene resin can be preferably used. Examples of the thermoplastic norbornene resin include ZEONEX and ZEONOR (manufactured by Zeon Corporation) and ARTON (manufactured by JSR Corporation).

In addition, as the material for forming the transparent support, a cellulose polymer (hereinafter, referred to as "cellulose acylate") represented by triacetyl cellulose can also be preferably used.

An in-plane retardation Re(550) of the transparent support at a wavelength of 550 nm is not particularly limited, and from the viewpoint of further improving the effects of the present invention, Re(550) of the laminate in which the transparent support and the patterned optical anisotropic layer are laminated is preferably 110 to 165 nm, more preferably 112 to 150 nm, and still more preferably 115 to 140 nm.

A thickness-direction retardation Rth(550) of the transparent support at a wavelength of 550 nm is not particularly limited, and from the viewpoint of further improving the effects of the present invention, Rth(550) of the laminate in which the transparent support and the patterned optical anisotropic layer are laminated is preferably 0 to 20 nm, more preferably 0 to 10 nm, and still more preferably 0 to 5 mm.

The thickness of the transparent support is not particularly limited and, from the viewpoint of reducing the thickness of the optical laminate, is preferably 1 to 60 μm and more preferably 1 to 40 μm.

Various additives (for example, an optical anisotropy adjusting agent, a wavelength dispersion adjusting agent, fine particles, a plasticizer, an ultraviolet absorber, a deterioration inhibitor, or a release agent) can be added to the transparent support.

<Alignment Film>

In addition, optionally, the alignment film may be provided between the transparent support and the patterned optical anisotropic layer. By providing the alignment film, the alignment direction of the liquid crystal compound in the patterned optical anisotropic layer is easily controlled.

In general, the alignment film includes a polymer as a major component. The polymer material for the alignment film is described in many documents, and a plurality of commercially available products are available. As the polymer material to be used, polyvinyl alcohol, polyimide, or a derivative thereof is preferable. In particular, modified or unmodified polyvinyl alcohol is preferable. The alignment film that can be used in the present invention can refer to modified polyvinyl alcohols described in page 43, line 24 to page 49, line 8 of WO2001/88574A and paragraphs "0071" to "0095" of JP3907735B.

Typically, a well-known rubbing treatment is performed on the alignment film. That is, typically, it is preferable that the alignment film is a rubbed alignment film on which a rubbing treatment is performed.

It is preferable that the thickness of the alignment film is thin. However, from the viewpoints of imparting the alignment ability for forming the patterned optical anisotropic layer and alleviating the surface unevenness of the transparent support to form the patterned optical anisotropic layer having a uniform thickness, a certain degree of thickness is necessary. Specifically, the thickness of the alignment film is preferably 0.01 to 10 μm, more preferably 0.01 to 1 μm, and still more preferably 0.01 to 0.5 μm.

In addition, in the present invention, it is also preferable to use a photo-alignment film. The photo-alignment film is not particularly limited, and a photo-alignment film described in paragraphs "0024" to "0043" of WO2005/096041, LPP-JP265CP (trade name, manufactured by Rolic Technologies Ltd.), or the like can be used.

In addition, the optical laminate according to the embodiment of the present invention may include an antireflection layer. The antireflection layer is preferably an antiglare layer and may be a layer of low refractive index, a layer of intermediate refractive index, or a layer of high refractive index.

It is preferable that the antiglare layer includes a binder and translucent particles for imparting anti-glare characteristics and surface unevenness is formed by protrusions formed of the translucent particles themselves or protrusions formed of an aggregate of a plurality of particles.

The refractive index of the layer of high refractive index is preferably 1.70 to 1.74 and more preferably 1.71 to 1.73. The refractive index of the layer of intermediate refractive index is adjusted to be a value between the refractive index of the layer of low refractive index and the refractive index of the layer of high refractive index. The refractive index of the layer of intermediate refractive index is preferably 1.60 to 1.64 and more preferably 1.61 to 1.63. The refractive index of the layer of low refractive index is preferably 1.30 to 1.47. In a case where an antireflection film of a multilayer thin film interference type (layer of intermediate refractive index/layer of high refractive index/layer of low refractive index) is used, the refractive index of the layer of low refractive index is preferably 1.33 to 1.38 and more preferably 1.35 to 1.37.

As a method of forming the layer of high refractive index, the layer of intermediate refractive index, and the layer of low refractive index, a transparent thin film that is formed of an inorganic oxide using a chemical vapor deposition (CVD) method or a physical vapor deposition (PVD) method, in particular, a vacuum deposition method or a sputtering method that is a physical vapor deposition can also be used, and an all wet coating method is preferable.

As the layer of high refractive index, the layer of intermediate refractive index, and the layer of low refractive index, a layer described in paragraphs "0197" to "0211" of JP2009-98658A can be used.

Here, the total thickness of the optical laminate 10 is preferably 6 μm to 80 μm, more preferably 10 μm to 75 μm, and still more preferably 15 μm to 70 μm.

In a case where the total thickness of the optical laminate 10 is excessively large, a difference between the positions of the pixels of the display panel and the positions of the first phase difference region and the second phase difference region in the patterned optical anisotropic layer in case of being seen from an oblique direction is large, which increases crosstalk. Therefore, by adjusting the total thickness of the optical laminate 10 to be in the above-described range, crosstalk in an oblique direction can be more suitably suppressed, and crosstalk at a wide viewing angle can be reduced.

<Method of Manufacturing Patterned Optical Anisotropic Layer>

A method of manufacturing the patterned optical anisotropic layer according to the present invention (hereinafter also referred to as "the manufacturing method according to the embodiment of the present invention") is a method of manufacturing the patterned optical anisotropic layer including the above-described optical laminate, the method comprising, in the following order:

an alignment film application step of applying a coating solution for forming an alignment film to a substrate to form a coating film;

an exposure step of performing pattern exposure on the coating film formed on the substrate using an exposure mask;

a rubbing step of rubbing the coating film on which the pattern exposure is performed to form the alignment film; and a composition application step of applying a composition for forming the patterned optical anisotropic layer to the alignment film, in which in the exposure step, the exposure mask and the coating film are closely attached to each other and are pressed at a pressure of 0.03 MPa to 0.7 MPa for the exposure.

The alignment film application step is a step of applying a coating solution for forming an alignment film to a substrate to form a coating film. A material of the alignment film is as described above.

Here, in the present invention, it is preferable that a photoacid generator is added to the coating solution for forming the alignment film. As the photoacid generator used for the alignment film, a water-soluble compound is preferably used.

Examples of the photoacid generator that can be used include a compound described in page 1485, Vol. 23, Prog. Polym. Sci. (1998). As the photoacid generator, a pyridinium salt, an iodonium salt, or a sulfonium salt is more preferably used. The details of the method are described in JP2010-289360, the content of which is incorporated herein by reference.

The exposure step is a step of performing pattern exposure on the coating film formed on the substrate using an exposure mask.

In the exposure mask, opening portions having the same shape as the first phase difference region (or the second phase difference region) are formed in the same lattice pattern as that of the first phase difference region. By irradiating the coating film with light through the exposure mask, portions of the coating film for forming the first phase difference regions are irradiated with light, and portions of the coating film for forming the second phase difference regions are prevented from being irradiated with light. That is, by exposing the coating film through the exposure mask, regions that are exposed and regions that are not exposed are formed in the lattice pattern. In the above-described description, the portions for forming the first phase difference regions are exposed, and the portions for forming the second phase difference regions are not exposed, but the present invention is not limited thereto. A configuration in which the portions for forming the second phase difference regions are exposed and the portions for forming the first phase difference regions are not exposed may be adopted.

It is preferable to use light having a wavelength of 250 nm to 380 nm for the light irradiation in the exposure step.

The rubbing step is a step of rubbing the coating film on which the pattern exposure is performed to form the alignment film. The rubbing treatment that is performed in the rubbing step may be a well-known rubbing treatment.

Through the alignment film application step, the exposure step, and the rubbing step, the alignment film is formed. By performing the pattern exposure and the rubbing treatment for the formation of the alignment film, the regions having different alignment directions by the alignment film are formed in the lattice pattern. As a result, the first phase difference region and the second phase difference region having different in-plane slow axis directions can be formed in the lattice pattern on the patterned optical anisotropic layer formed on the alignment film. This point will be described below.

The composition application step is a step of applying a composition for forming the patterned optical anisotropic layer to the alignment film.

Materials in the composition for forming the patterned optical anisotropic layer are as described above. In addition, for the application of the composition, various well-known methods used for applying liquid, for example, bar coating, gravure coating, or spray coating can be used. In addition, the coating thickness of the composition (the thickness of the coating film) that is required to obtain a patterned optical anisotropic layer having a desired thickness may be appropriately set depending on the composition and the like.

Here, the regions having different alignment directions are formed on the alignment film in the lattice pattern. Therefore, the liquid crystal compound in the composition applied to the alignment film is aligned according to the alignment film in different directions depending on the regions of the lattice pattern.

The composition applied to the alignment film is optionally dried and/or heated and then cured. The composition may be cured using a well-known method such as photopolymerization or thermal polymerization. For the polymerization, photopolymerization is preferable. Regarding the light irradiation, ultraviolet light is preferably used. The irradiation energy is preferably 20 mJ/cm$^2$ to 50 J/cm$^2$ and more preferably 50 mJ/cm$^2$ to 1500 mJ/cm$^2$. In order to promote a photopolymerization reaction, light irradiation may be performed under heating conditions or in a nitrogen atmosphere. The wavelength of irradiated ultraviolet light is preferably 250 nm to 430 nm.

By curing the composition, the liquid crystal compound in the composition is immobilized in a state where it is aligned according to the alignment film in different directions depending on the regions of the lattice pattern. As a result, the patterned optical anisotropic layer in which the first phase difference region and the second phase difference region having different in-plane slow axis directions are formed in the lattice pattern is formed.

Immediately before a timing of moment where the patterned optical anisotropic layer is completed, the liquid crystal compound does not have to exhibit liquid crystallinity. For example, the molecular weight of the polymerizable liquid crystal compound may be increased by a curing reaction such that the liquid crystallinity thereof is lost.

Here, as described above, in the manufacturing method according to the embodiment of the present invention, the pattern exposure and the rubbing treatment are performed during the formation of the alignment film.

In a case where the photoacid generator is added to the coating solution for forming the alignment film and the pattern exposure using the above-described exposure mask is performed, in the regions that are exposed (exposed portions), the photoacid generator is decomposed to produce an acidic compound. On the other hand, in the regions (non-exposed portions) that are not exposed, the photoacid generator remains in a state where it is not substantially decomposed. In the non-exposed portions, an interaction between the alignment film material, the liquid crystal compound in the composition for forming the patterned optical anisotropic layer, and the alignment control agent that is optionally added controls the alignment state, and the liquid crystal compound in the composition that is applied to the alignment film is aligned in a direction in which the slow axis thereof is perpendicular to the rubbing direction. On the other hand, in the exposed portions, the acidic compound is produced by light irradiation. Therefore, the interaction is not predominant any more, the rubbing direction of the alignment film controls the alignment state, and the liquid crystal compound in the composition is aligned such that the slow axis thereof is parallel to the rubbing direction.

As a result, the direction of the in-plane slow axis of the optically-anisotropic layer formed on the exposed portion of the alignment film and the direction of the in-plane slow axis of the optically-anisotropic layer formed on the non-exposed portion of the alignment film are different from each other, and the first phase difference region and the second phase difference region having different in-plane slow axis directions are formed. In addition, as described above, the exposed portion and the non-exposed portion are formed in the lattice pattern. Therefore, the first phase difference region and the second phase difference region are formed in the lattice pattern.

In addition, a clear boundary is not formed between the exposed portion and the non-exposed portion of the alignment film due to light leak during the exposure, the flow of the photoacid generator in the coating film, and the like. Therefore, in a boundary portion between the first phase difference region and the second phase difference region, the boundary region where the liquid crystal compound is not aligned in a uniform direction is formed.

In addition, in a case where the irradiation energy (the cumulative amount of light or the exposure amount) during the pattern exposure in the exposure step is excessively high or excessively low, the substantial sizes of the exposed portion and the non-exposed portion are not uniform, one of the exposed portion or the non-exposed portion is larger, and another one of the exposed portion or the non-exposed portion is smaller. For example, in a case where the irradiation energy is excessively low, the decomposition of the photoacid generator in the coating film does not sufficiently progress. Therefore, the substantial size of the exposed portion is smaller than the opening portion of the exposure mask, and the size of the exposed portion is smaller than that of the non-exposed portion. Conversely, in a case where the irradiation energy is excessively high, the acidic compound that is produced due to the decomposition of the photoacid generator is diffused in the coating film and penetrates the non-exposed portion. Therefore, the substantial size of the exposed portion is larger than the opening portion of the exposure mask, and the size of the exposed portion is larger than that of the non-exposed portion.

This way, in a case where the sizes of the exposed portion and the non-exposed portion in the alignment film are different from each other, as shown in FIGS. 3 and 4, the sizes of a first retardation layer and a second retardation layer in the patterned optical anisotropic layer formed on the alignment film are different from each other.

Here, in the manufacturing method according to the embodiment of the present invention, in the exposure step, the exposure mask and the coating film are closely attached to each other and are pressed at a pressure of 0.03 MPa to 0.7 MPa for the exposure. That is, as shown in FIG. 7, in a state where an exposure mask M and a coating film (alignment film) 16 are closely attached to each other and are pressed at a pressure P, the coating film 16 is irradiated with light I through an exposure mask M.

As a result, light leak during the exposure is suppressed, the width of the boundary region that is formed in the boundary portion between the first phase difference region and the second phase difference region and in which the liquid crystal compound is not aligned in a uniform direction can be reduced.

Only with the configuration where the exposure mask and the coating film are brought into contact with each other during the exposure, there is a gap between the exposure mask and the coating film. Therefore, it is difficult to sufficiently suppress light leak during the exposure, and it is difficult to reduce the width of the boundary region. On the other hand, by pressing the exposure mask and the coating film at a pressure of 0.03 MPa to 0.7 MPa to be closely attached to each other, the formation of a gap between the exposure mask and the coating film can be suppressed, light leak during the exposure can be sufficiently suppressed, and the width of the boundary region can be further reduced.

The pressure for closely attaching the exposure mask and the coating film to each other is preferably 0.03 MPa to 0.7 MPa, more preferably 0.1 MPa to 0.6 MPa, and still more preferably 0.2 MPa to 0.5 MPa.

In addition, in the manufacturing method according to the embodiment of the present invention, in the exposure step, the exposure mask and the coating film are closely attached to each other and are pressed at a pressure of 0.03 MPa to 0.7 MPa for the exposure. Therefore, the rubbing step is performed after the exposure step. In a case where the exposure mask and the coating film are closely attached to each other after the rubbing step, a rubbed surface formed by the rubbing treatment is destructed. Therefore, the rubbing step is performed after the exposure step.

In addition, in the exposure step, in order to reduce a difference in substantial size between the exposed portion and the non-exposed portion in the alignment film, the irradiation energy of light (the cumulative amount of light or the exposure amount) may be appropriately set depending on the composition of the coating solution for forming the alignment film and the like.

The method of forming the patterned optical anisotropic layer according to the embodiment of the present invention is not limited to the aspect of adding the photoacid generator to the alignment film and performing the pattern exposure.

For example, as another method of forming the patterned optical anisotropic layer, a method of using a plurality of actions for controlling the alignment of the liquid crystal compound and eliminating some actions due to an external stimulus (for example, a heat treatment) such that a predetermined alignment control action is predominant can be used. In the above-described method, for example, the liquid crystal compound is aligned to a predetermined alignment state due to a combined action of an alignment control ability by the alignment film and an alignment control ability of the alignment control agent added to the liquid crystal compound, and this alignment state is immobilized to form one phase difference region. Next, some actions (for example, the action by the alignment control agent) are eliminated by an external stimulus (for example, a heat treatment) such that another alignment control action (the action by the alignment film) is predominant. As a result, another alignment state is realized, and this alignment state is immobilized to form another phase difference region. The details of the method are described in paragraphs "0017" to "0029" of JP2012-008170A, the content of which is incorporated herein by reference.

Alternatively, another method of forming the patterned optical anisotropic layer is an aspect of using the patterned alignment film. In this aspect, the patterned alignment film having different alignment control abilities is formed, the liquid crystal compound is disposed on the patterned alignment film, and the liquid crystal compound is aligned. The different alignment states of the liquid crystal compound are achieved by the alignment control abilities of the patterned alignment film. By immobilizing the alignment states, the pattern of the first and second phase difference regions is formed depending on the pattern of the alignment film.

The patterned alignment film can be formed using a printing method, mask rubbing on the rubbed alignment film, the mask exposure on the photo-alignment film, or the like. From the viewpoint that a large-scale facility is unnecessary and that manufacture is easy, the method using the printing method is preferable. The details of the method are described in paragraphs "0166" to "0181 of JP2012-032661A, the content of which is incorporated herein by reference.

<Method of Manufacturing Optical Laminate>

The optical laminate according to the embodiment of the present invention is prepared by bonding the patterned optical anisotropic layer prepared as described above and a polarizing film directly or through an adhesive layer or a pressure sensitive adhesive layer. In a case where the patterned optical anisotropic layer and the polarizing film are bonded, the patterned optical anisotropic layer may be used as it is by peeling off the substrate and the alignment film, may be used in the form of a laminate including the patterned optical anisotropic layer and the alignment film by peeling off the substrate, or may be used in the form of a laminate including the substrate and the alignment film. In a case where the patterned optical anisotropic layer is used in the form of a laminate including the substrate, the above-described transparent support may be used as the substrate.

In addition, a step of continuously laminating the layers of the optical laminate in a state where each of the layers is elongated may be provided. The elongated optical laminate is cut according to the size of a screen of an image display apparatus to be used.

<3D Image Display Apparatus>

A 3D image display apparatus according to the embodiment of the present invention comprises:
a display panel that is driven based on an image signal; and
the above-described optical laminate that is disposed on a visible side of the display panel,
in which the optical laminate is disposed such that the polarizing film side faces the display panel.

FIG. 8 is a cross-sectional view schematically showing an example of the 3D image display apparatus according to the embodiment of the present invention.

A 3D image display apparatus 50 shown in FIG. 8 includes a display panel 52 and the optical laminate 10. The optical laminate 10 has the same configuration as the above-described optical laminate 10.

The display panel 52 has a configuration in which a plurality of pixels are arranged in a plane and is driven to display an image based on an image signal. In the 3D image display apparatus 50, the display panel 52 has a configuration in which a pixel (right eye image display unit 54) that displays a right eye image and a pixel (left eye image display unit 56) that displays a left eye image are alternately arranged. The right eye image display unit 54 and the left eye image display unit 56 are separated by a black matrix 58.

The optical laminate 10 is laminated on the visible side of the display panel 52 such that the polarizing film 20 side faces the display panel 52. In the patterned optical anisotropic layer 18 of the optical laminate 10, the first phase difference region 22 is positioned at a position of the right eye image display unit 54 in a plane direction, and the right eye image display unit 54 converts a displayed image (light) into circularly polarized light for the right eye. The second phase difference region 24 is positioned at a position of the left eye image display unit 56, and the left eye image display unit 56 converts a displayed image (light) into circularly polarized light for the left eye.

The right eye image and the left eye image are images having a parallax between the right eye and the left eye. The images can be generated, for example, by imaging an object using two cameras at the same time.

The pixel pitch of the display panel 52 is not particularly limited and, from the viewpoint of suitability for a combination with the optical laminate 10, is preferably 10 to 250 m, more preferably 10 to 130 µm, and still more preferably 10 to 80 µm.

Regarding a relationship between the pixel pitch of the display panel 52 and each of the regions in the patterned optical anisotropic layer 18, it is preferable that the width of the pixel pitch is substantially the same as the total width of the one side length of one of the first phase difference region 22 or the second phase difference region 24 in the patterned optical anisotropic layer 18 and the width of the boundary line, and the total width is preferably lower than ±20%, more preferably lower than ±10%, and still more preferably lower than ±5% with respect to the width of the pixel pitch.

In addition, it is preferable that the centers of the widths of the first phase difference region 22 and the second phase difference region 24 in the patterned optical anisotropic layer 18 match with the centers of the pitch widths of the right eye image display unit 54 and the left eye image display unit 56 in the display panel 52, respectively, and a variation between the center positions (difference in position between the center of the phase difference region and the center of the image display unit) as a distribution including a variation is preferably 30 µm or less, more preferably 15 µm or less, and still more preferably 5 µm or less.

In addition, in the optical laminate 10, it is preferable that the arrangement directions (the x direction and the y direction) of the first phase difference region 22 and the second phase difference region 24 in the patterned optical anisotropic layer 18 match with the arrangement directions of the pixels in the display panel.

In the present invention, the display panel is not particularly limited. For example, the display panel may be a liquid crystal panel including a liquid crystal layer, an organic EL display panel including an organic EL layer, or a plasma display panel. In any aspect, various possible configurations can be adopted. In addition, in a case where the liquid crystal panel includes a polarizing film for displaying an image on the visible side surface as in a liquid crystal panel in a transmission mode, the optical laminate according to the embodiment of the present invention may be used in combination with the polarizing film to achieve the above-described function.

<3D Image Display System>

A 3D image display system according to the embodiment of the present invention comprises:
the above-described 3D image display apparatus; and
a right circular polarization plate and a left circular polarization plate that are disposed on a visible side of the 3D image display apparatus,
in which a stereoscopic image is seen through the right circular polarization plate and the left circular polarization plate.

FIG. 9 is a diagram schematically showing an example of the 3D image display system according to the embodiment of the present invention.

The 3D image display system shown in FIG. 9 includes the 3D image display apparatus 50, a right circular polarization plate 62R, and a left circular polarization plate 62L. The 3D image display apparatus 50 has the same configuration as the above-described 3D image display apparatus 50.

The right circular polarization plate 62R allows transmission of right circularly polarized light and cuts left circularly polarized light. The left circular polarization plate 62L allows transmission of left circularly polarized light and cuts right circularly polarized light.

The right circular polarization plate 62R and the left circular polarization plate 62L are disposed, for example, at positions of right and left lenses of glasses and used.

As described above, in the 3D image display apparatus 50, due to the optical laminate 10 (patterned optical anisotropic layer 18) laminated on the display panel 52, the right eye image display unit 54 of the display panel 52 converts a displayed image (light) into circularly polarized light for the right eye, and the left eye image display unit 56 converts a displayed image (light) into circularly polarized light for the left eye.

For example, in the 3D image display apparatus 50, the right eye image is converted into right circularly polarized light, and the left eye image is converted into left circularly polarized light. In addition, an observer wears glasses including the right circular polarization plate 62R on the right eye side and the left circular polarization plate 62L on the left eye side and observes the 3D image display apparatus 50. In this case, at the right eye of the observer, left circularly polarized light is cut and right circularly polarized light arrives such that only the right eye image is seen. At the left eye of the observer, right circularly polarized light is cut and left circularly polarized light arrives such that only the left eye image is seen. As a result, the observer can see the image as a stereoscopic image (3D image) having a depth.

Hereinabove, the optical laminate, the method of manufacturing the patterned optical anisotropic layer, the 3D image display apparatus, and the 3D image display system according to the embodiment of the present invention have been described in detail. However, the present invention is not limited to the above-described examples, and various improvements and modifications can be made within a range not departing from the scope of the present invention.

EXAMPLES

The present invention will be described in more detail based on the following examples. Materials, used amounts, ratios, treatment details, treatment procedures, and the like shown in the following examples can be appropriately changed within a range not departing from the scope of the present invention. Accordingly, the scope of the present invention is not limited to the following examples.

Example 1

(Preparation of Transparent Support)

The following composition was put into a mixing tank, and the respective components were stirred under heating and dissolved to prepare a cellulose acylate solution A.
<Composition of Cellulose Acylate Solution A>

| | |
|---|---|
| Cellulose acetate having a substitution degree of 2.86 | 100 parts by mass |
| Triphenyl phosphate (plasticizer) | 7.8 parts by mass |
| Biphenyl diphenyl phosphate (plasticizer) | 3.9 parts by mass |
| Methylene chloride (first solvent) | 300 parts by mass |
| Methanol (second solvent) | 54 parts by mass |
| 1-butanol | 11 parts by mass |

The following composition was put into another mixing tank, and the respective components were stirred under heating and dissolved to prepare an additive solution B.
<Composition of Additive Solution B>

| | |
|---|---|
| The following compound B1 (Re decreasing agent) | 40 parts by mass |
| The following compound B2 (wavelength dispersion control agent) | 4 parts by mass |
| Methylene chloride (first solvent) | 80 parts by mass |
| Methanol (second solvent) | 20 parts by mass |

Compound B1

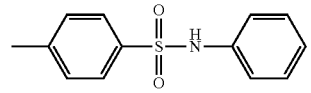 [SMILES: Cc1ccc(S(=O)(=O)Nc2ccccc2)cc1]

Compound B2

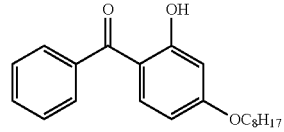

<Preparation of Cellulose Acetate Film>

40 parts by mass of the additive solution B was added to 477 parts by mass of the cellulose acylate solution A, and the mixture was sufficiently stirred to prepare a dope. The dope was cast from a casting nozzle to a drum cooled to 0° C. The obtained film was removed in a state where the solvent content was about 70 mass %, opposite ends of the film in the width direction were fixed using a pin tenter (pin tenter shown in FIG. 3 of JP1992-1009A (JP-H4-1009A), and the film was dried while maintaining intervals such that a stretching rate in the transverse direction (direction perpendicular to the machine direction) was 3% in a state where the solvent content was 3 to 5 mass %. Next, the obtained film was transported to a gap between rolls of a heat treatment device to be further dried. As a result, a cellulose acetate film having a thickness of 61 μm was prepared in the form of a roll. The front Re of the cellulose acetate film was 2.0 nm. A 30 cm×18 cm film was cut from the prepared cellulose acetate film in the form of a roll and was used as a transparent support. In this case, the longitudinal direction of the transparent support was set to be parallel to the machine direction (longitudinal direction) of the cellulose acetate film in the form of a roll.

(Formation of Alignment Film)

The following coating solution for an alignment film was prepared, was filtered through a filter formed of polypropylene having a pore diameter of 0.2 μm, and was used as a coating solution for an alignment film. This coating solution was applied to a surface of the transparent support using a No. 8 bar and was dried at 100° C. for 1 minute to form a coating film of the alignment film. Next, an exposure mask where 1.5 mm square opening portions were formed in a lattice pattern was brought into contact with the coating film, and the exposure mask and the coating film were pressed at a pressure of 0.05 MPa and were irradiated with ultraviolet light in the UV-C range using an air-cooled metal halide lamp (manufactured by Eye Graphics Co., Ltd.) at an illuminance of 2.5 mW/cm$^2$ for 4 seconds in air at room temperature. As a result, a photoacid generator was decomposed to produce an acidic compound, and thus an alignment layer corresponding to the first phase difference region was formed. Next, the alignment layer was rubbed once in one direction at 500 rpm to form a rubbed alignment film. An angle of the direction of the rubbing treatment with respect to the longitudinal direction of the transparent support was 45°.

The thickness of the alignment film was 0.5 μm.

<Coating Solution for Alignment Layer>

| | |
|---|---|
| Polymer material for an alignment film (PVA 103, polyvinyl alcohol manufactured by Kuraray Co., Ltd.) | 3.9 parts by mass |
| Photoacid generator (S-1) | 0.1 parts by mass |
| Methanol | 36 parts by mass |
| Water | 60 parts by mass |

Photoacid Generator S-1

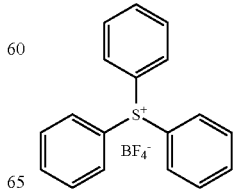

(Preparation of Patterned Optical Anisotropic Layer)

The following composition for an optically-anisotropic layer was prepared, was filtered through a filter formed of polypropylene having a pore diameter of 0.2 µm, and was used as a coating solution for an optically-anisotropic layer. This coating solution was applied to the rubbed alignment film, was dried at a film surface temperature of 110° C. for 2 minutes to enter a liquid crystal phase state, and was uniformly aligned. Next, the coating film was cooled to 100° C. and was irradiated with ultraviolet light using an air-cooled metal halide lamp (manufactured by Eye Graphics Co., Ltd.) of 20 mW/cm² in air for 20 seconds to immobilize the alignment state. As a result, the patterned optical anisotropic layer was formed. In a mask exposed portion (first phase difference region), a discotic liquid crystal was vertically aligned such that the slow axis direction was parallel to the rubbing direction. In a non-exposed portion (second phase difference region), the discotic liquid crystal was vertically aligned such that the slow axis direction was perpendicular to the rubbing direction. The thickness of the patterned optical anisotropic layer was 1.1 µm, and the front Re was 122 nm.

<Composition for Optically-Anisotropic Layer>

| | |
|---|---|
| Discotic liquid crystal E-1 | 100 parts by mass |
| Alignment film interface alignment agent (II-1) | 3.0 parts by mass |
| Air interface alignment agent (P-1) | 0.4 parts by mass |
| Photopolymerization Initiator (IRGACURE 907, manufactured by Ciba Specialty Chemicals Inc.) | 3.0 parts by mass |
| Sensitizer KAYACURE DETX (manufactured by Nippon Kayaku Co., Ltd.) | 1.0 parts by mass |
| Methyl ethyl ketone | 400 parts by mass |

Discotic Liquid Crystal E-1

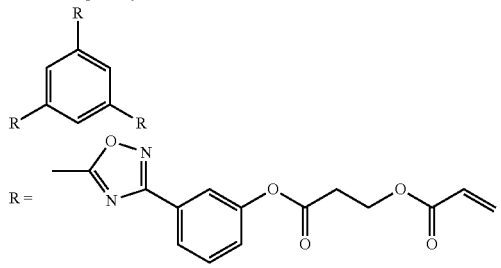

Alignment Film Interface Alignment Agent (II-1)

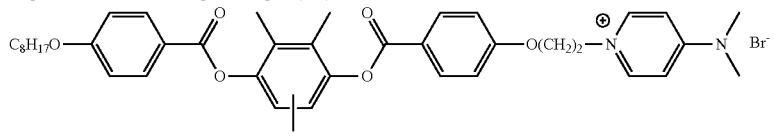

Air Interface Alignment Agent (P-1)

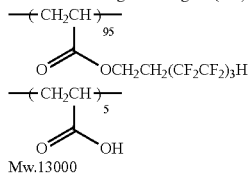

Mw.13000

In addition, in a boundary portion between the first phase difference region and the second phase difference region, the boundary region where the liquid crystal compound was not uniformly aligned was formed. In a case where the width of the boundary region was measured using the above-described method, the width was 18 µm. In addition, the area of the first phase difference region was larger than that of the second phase difference region, and adjacent first phase difference regions were connected through corner portions in the state shown in FIG. 3. In a case where the average interval between corner portions of adjacent second phase difference regions were measured using the above-described method, the average interval was 50 µm.

In addition, in a case where in-plane slow axis directions of the first phase difference region and the second phase difference region were observed using a polarization microscope, angles of the in-plane slow axis directions with respect to the longitudinal direction of the transparent support were +45° and −45°, respectively.

(Formation of Rubbed Alignment Film)

A 4% aqueous solution of polyvinyl alcohol "PVA103" (manufactured by Kuraray Co., Ltd.) was applied to a surface of the transparent support opposite to a surface where the patterned optical anisotropic layer was formed using a No. 12 bar and was dried at 80° C. for 5 minutes. Next, the coating film was rubbed three times in the longitudinal direction of the transparent support at 400 rpm to form a rubbed alignment film.

(Preparation of Coating Solution for Linear Polarizing Layer) 0.24 parts by mass of a yellow azo colorant A2-3 having the following structure, 0.33 parts by mass of a magenta azo colorant A-46 having the following structure, 0.37 parts by mass of a cyan azo colorant A3-1 having the following structure, and 0.06 parts by mass of a squarylium colorant VI-5 having the following structure were added to 99 parts by mass of chloroform, and the components were stirred, dissolved, and then filtered. As a result, a coating solution for a linear polarizing layer was obtained.

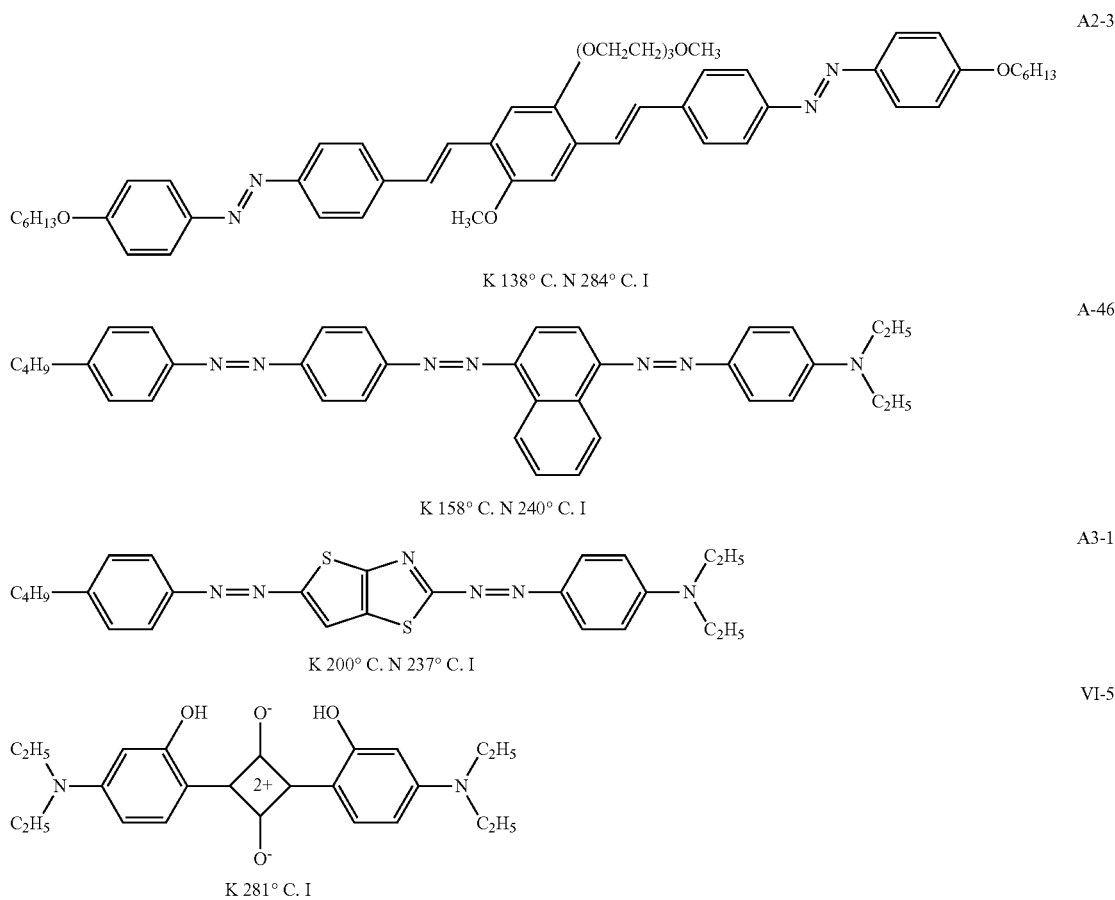

(Preparation of Polarizing Film)

The prepared coating solution for a linear polarizing layer was applied to the rubbed alignment film and was naturally dried at room temperature to prepare a linear polarizing layer (polarizing film). The thickness of the obtained linear polarizing layer was 0.4 m, and a dichroic ratio was 42. In addition, angles of the in-plane slow axes of the first phase difference region and the second phase difference region in the patterned optical anisotropic layer with respect to the transmission axis of the linear polarizing layer were +45° and −45°, respectively.

(Preparation of Coating Solution for Oxygen Barrier Layer)

The following composition was put into a mixing tank and was stirred to prepare a coating solution for an oxygen barrier layer.

3.2 parts by mass of polyvinyl alcohol (PVA 205 (trade name), manufactured by Kuraray Co., Ltd.), 1.5 parts by mass of polyvinylpyrrolidone (PVP, K-30 (trade name), manufactured by Nippon Shokubai Co., Ltd.), 44 parts by mass of methanol, and 56 parts by mass of water were added and stirred. The solution was filtered through a filter formed of polypropylene having a pore diameter of 0.4 μm to prepare a coating solution for an oxygen barrier layer.

(Preparation of Oxygen Barrier Layer)

The coating solution for an oxygen barrier layer was applied to an upper layer of the linear polarizing layer and was dried at 1000 for 2 minutes to prepare an oxygen barrier layer. The thickness of the oxygen barrier layer was 1 μm, and the front Re was 0 nm.

(Preparation of Coating Solution for Transparent Resin Cured Layer)

The following composition was put into a mixing tank and was stirred to prepare a coating solution for a transparent resin cured layer.

2.7 parts by mass of poly(glycidyl methacrylate) having a mass average molecular weight of 15000, 7.3 parts by mass of methyl ethyl ketone, 5.0 parts by mass of cyclohexanone, and 0.5 parts by mass of a photopolymerization initiator (IRGACURE 184 (trade name), manufactured by Ciba Specialty Chemicals Inc.) were added to 7.5 parts by mass of trimethylolpropane triacrylate (VISCOAT CODE #295 (trade name, manufactured by Osaka Organic Chemical Industry Ltd.), and the components were stirred. The solution was filtered through a filter formed of polypropylene having a pore diameter of 0.4 μm to prepare a coating solution for a transparent resin cured layer.

(Preparation of Coating Solution for Transparent Resin Cured Layer)

The coating solution for a transparent resin cured layer was applied to an upper layer of the oxygen barrier layer and was dried at 100° for 2 minutes. Next, the coating film was polymerized by irradiation of ultraviolet light at 5 J in a nitrogen atmosphere (oxygen concentration: 100 ppm or less), and an oxygen barrier layer having a thickness of 1 μm and a transparent resin cured layer having a thickness of 2 μm were sequentially laminated on a surface of the linear polarizing layer (thickness: 0.4 μm). The front Re of the transparent resin cured layer was 0 nm.

As a result, an optical laminate was prepared. The total thickness of the optical laminate was 66 sm.

Examples 2 and 3

Optical laminates were prepared using the same method as that of Example 1, except that the pressures applied to the exposure mask and the coating film during the formation of the alignment film of the patterned optical anisotropic layer were changed to 0.1 MPa and 0.3 MPa, respectively.

The width of the boundary region in the patterned optical anisotropic layer according to Example 2 was 10 μm. In addition, the average interval of corner portions of adjacent second phase difference regions was 37 m.

The width of the boundary region in the patterned optical anisotropic layer according to Example 3 was 5 μm. In addition, the average interval of corner portions of adjacent second phase difference regions was 13 μm.

Examples 4 and 5

An optical laminate was prepared using the same method as that of Example 3, except that the irradiation energies (exposure amounts) during the formation of the alignment film of the patterned optical anisotropic layer were changed to 2.8 mW/cm$^2$×4 seconds and 2.1 mW/cm$^2$×4 seconds, respectively.

The width of the boundary region in the patterned optical anisotropic layer according to Example 4 was 5 μm. In addition, the average interval of corner portions of adjacent second phase difference regions was 23 μm.

The width of the boundary region in the patterned optical anisotropic layer according to Example 5 was 5 m. In addition, the average interval of corner portions of adjacent second phase difference regions was 7 μm.

In addition, FIG. 10 is a micrograph showing corner portions of phase difference regions in the patterned optical anisotropic layer prepared in Example 5. In Example 5, the areas of the first phase difference region and the second phase difference region were substantially the same, and the phase difference regions were not connected through the corner portions.

Example 6

(Preparation of Polarizing Film) The cellulose acetate film prepared using the method described in Example 1 was dipped in a 1.5 N sodium hydroxide aqueous solution at 55° C. for 2 minutes. The cellulose acylate film was cleaned in a water cleaning bath at room temperature and was further neutralized using 0.1 N sulfuric acid at 30° C. Further, the cellulose acylate film was cleaned in a water cleaning bath at room temperature and was dried with warm air at 100° C. This way, the surface of the cellulose acylate film was saponified.

Next, the roll-shaped polyvinyl alcohol film having a thickness of 80 μm was continuously stretched to 5 times in an iodine aqueous solution, and was dried to obtain a linear polarizing film. Two cellulose acylate films on which an alkali saponification treatment was performed were prepared and were bonded with the linear polarizing film interposed therebetween using a polyvinyl alcohol (PVA-117H, manufactured by Kuraray Co., Ltd.) 3% aqueous solution as an adhesive. As a result, a polarizing film having both surfaces protected by the cellulose acylate films was obtained. In this case, the cellulose acylate films were bonded such that the slow axes were parallel to the transmission axis of the linear polarizing film.

(Preparation of Patterned Optical Anisotropic Layer)

The polarizing film prepared as described above was used as a support, an alignment film was formed on one surface of the cellulose acylate film for protecting the polarizing film using the same method as that of Example 1, and a patterned optical anisotropic layer was prepared on the alignment film. The exposure mask was disposed to expose the alignment film such that arrangement directions of the exposed portion and the non-exposed portion matched with a transmission axis direction of the polarizing film during the pattern exposure for forming the alignment film.

As a result, an optical laminate was prepared. The total thickness of the optical laminate was 142 μm.

The width of the boundary region in the patterned optical anisotropic layer according to Example 6 was 5 μm. In addition, the average interval of corner portions of adjacent second phase difference regions was 7 μm.

In Example 6, the areas of the first phase difference region and the second phase difference region were substantially the same, and the phase difference regions were not connected through the corner portions.

In a case where in-plane slow axis directions of the first phase difference region and the second phase difference region were observed using a polarization microscope, angles of the in-plane slow axis directions with respect to the longitudinal direction of the transparent support were +45° and −45°, respectively.

Example 7

An optical laminate was prepared using the same method as that of Example 5, except that the pressure applied to the coating film during the formation of the alignment film of the patterned optical anisotropic layer was changed to 0.5 MPa.

The width of the boundary region in the patterned optical anisotropic layer according to Example 7 was 5 μm. In addition, the average interval of corner portions of adjacent second phase difference regions was 7 μm.

Comparative Example 1

An optical laminate was prepared using the same method as that of Example 6, except a pressure was not applied to the exposure mask and the coating film and the irradiation energy (exposure amount) was changed to 2.5 mW/cm$^2$×4 seconds during the formation of the alignment film of the patterned optical anisotropic layer.

The width of the boundary region in the patterned optical anisotropic layer according to Comparative Example 1 was 25 μm. In addition, the average interval of corner portions of adjacent second phase difference regions was 73 μm.

In Comparative Example 1, the area of the first phase difference region was larger than that of the second phase difference region, and corner portions of adjacent first phase difference regions were connected.

Comparative Example 2

An optical laminate was prepared using the same method as that of Example 1, except that a pressure was not applied to the exposure mask and the coating film during the formation of the alignment film of the patterned optical anisotropic layer.

The width of the boundary region in the patterned optical anisotropic layer according to Comparative Example 2 was 25 µm. In addition, the average interval of corner portions of adjacent second phase difference regions was 71 µm.

In Comparative Example 2, the area of the first phase difference region was larger than that of the second phase difference region, and corner portions of adjacent first phase difference regions were connected.

[Evaluation]

A 3D image display apparatus was prepared using the optical laminate according to each of Examples and Comparative Examples, and front crosstalk and a crosstalk viewing angle were evaluated.

(Preparation of 3D Image Display Apparatus)

The polarizing film side of the optical laminate prepared as described above was disposed on a light emission surface side of a LED display panel "MAGNOLIA" (270 mm×480 mm, manufactured by Siliconcore Technology, Inc.) having a pixel pitch of 1.5 mm, and a 3D image display apparatus was prepared. In addition, the layers were disposed such that the centers of the widths of the first phase difference region and the second phase difference region matched with the center of the pixel pitch width of the display panel.

(Evaluation of Crosstalk)

The prepared 3D image display apparatus displayed a stereoscopic image where a right eye image was displayed by full-screen white and a left eye image was displayed full-screen black, a right eye part of 3D glasses was attached to a lens of a luminance meter BM-5A (manufactured by Topcon Technohouse Corporation), and the brightness was measured in the left-right direction on a basis of 1° in a polar angle range of +3° to −3°. Likewise a left eye part of the 3D glasses was attached to the lens of BM-5A, and the brightness was measured in the left-right direction on a basis of 1° in a polar angle range of +3° to −3°. The average value of brightness measured in the left eye part of the 3D glasses was divided by the average value of brightness measured in the right eye part of the 3D glasses, the obtained value was multiplied by 100, and the obtained value was set as crosstalk ((the brightness X measured in the left eye part/the brightness Y measured in the right eye part)×100)(%). A case where the crosstalk was lower than 5% was evaluated as "A", a case where the crosstalk was 5% or higher and lower than 6% was evaluated as "B", a case where the crosstalk was 6% or higher and lower than 7% was evaluated as "C", and a case where the crosstalk was lower than 7% was evaluated as "D".

(Evaluation of Crosstalk Viewing Angle)

The prepared 3D image display apparatus displayed a stereoscopic image where a right eye image was displayed by full-screen white and a left eye image was displayed full-screen black, a right eye part of 3D glasses was attached to a lens of a luminance meter BM-5A (manufactured by Topcon Technohouse Corporation), and the brightness was measured in the left-right direction on a basis of 1° in a polar angle range of +80° to −80°. Likewise a left eye part of the 3D glasses was attached to the lens of BM-5A, and the brightness was measured in the left-right direction on a basis of 1° in a polar angle range of +80° to −80°. The average value of brightness measured in the left eye part of the 3D glasses was divided by the average value of brightness measured in the right eye part of the 3D glasses, the obtained value was multiplied by 100, and the obtained value was set as crosstalk ((the brightness X measured in the left eye part/the brightness Y measured in the right eye part)×100) (%). A polar angle range where the crosstalk was lower than 7% was defined as a crosstalk viewing angle.

The results are shown in Table 1.

TABLE 1

| | | | Example 1 | Example 2 | Example 3 | Example 4 | Example 5 |
|---|---|---|---|---|---|---|---|
| Patterned Optical Anisotropic Layer | Exposure Step | Exposure Amount | 2.5 mW/cm$^2$ × 4 seconds | 2.5 mW/cm$^2$ × 4 seconds | 2.5 mW/cm$^2$ × 4 seconds | 2.8 mW/cm$^2$ × 4 seconds | 2.1 mW/cm$^2$ × 4 seconds |
| | | Pressure | 0.05 MPa | 0.1 MPa | 0.3 MPa | 0.3 MPa | 0.3 MPa |
| | Width of Boundary Region | | 18 µm | 10 µm | 5 µm | 5 µm | 5 µm |
| | Average Interval between Corner Portions | | 50 µm | 37 µm | 13 µm | 23 µm | 7 µm |
| Polarizing Film | Material, Preparation Method | | Dichroic Colorant Application | Dichroic Colorant Application | Dichroic Colorant Application | Dichroic Colorant Application | Dichroic Colorant Application |
| Optical Laminate Evaluation | Total Thickness | | 66 µm | 66 µm | 66 µm | 66 µm | 66 µm |
| | Front Crosstalk | | C | B | A | B | A |
| | Crosstalk Viewing Angle | | −10° to 10° | −16° to 16° | −33° to 33° | −21° to 21° | −38° to 38° |

| | | | Example 6 | Example 7 | Comparative Example 1 | Comparative Example 2 |
|---|---|---|---|---|---|---|
| Patterned Optical Anisotropic Layer | Exposure Step | Exposure Amount | 2.1 mW/cm$^2$ × 4 seconds | 2.1 mW/cm$^2$ × 4 seconds | 2.5 mW/cm$^2$ × 4 seconds | 2.5 mW/cm$^2$ × 4 seconds |
| | | Pressure | 0.3 MPa | 0.5 MPa | None | None |
| | Width of Boundary Region | | 5 µm | 5 µm | 25 µm | 25 µm |
| | Average Interval between Corner Portions | | 7 µm | 7 µm | 73 µm | 71 µm |
| Polarizing Film | Material, Preparation Method | | PVA Stretching | Dichroic Colorant Application | PVA Stretching | Dichroic Colorant Application |
| Optical Laminate Evaluation | Total Thickness | | 142 µm | 66 µm | 142 µm | 66 µm |
| | Front Crosstalk | | B | A | D | D |
| | Crosstalk Viewing Angle | | −10° to 10° | −36° to 36° | — | — |

It can be seen from Table 1 that, in a case where the optical laminate according to the present invention is used, the occurrence of crosstalk is suppressed.

In addition, it can be seen from a comparison between Examples 1 to 5 that, as the width of the boundary region and the interval between the corner portions of the phase difference regions decrease, the occurrence of crosstalk is more suitably suppressed.

In addition, it can be seen from a comparison between Examples 5 and 6 that, in a case where the total thickness of the optical laminate is 6 µm to 80 µm, the crosstalk viewing angle is improved, which is preferable. It can be seen that, since a dimensional change of the polarizing film in Example 5 is less likely to occur as compared to that in Example 6, in a case where the optical laminate is bonded to the display panel, misregistration between the pixels of the display panel and the phase difference regions of the patterned optical anisotropic layer is not likely to occur. Therefore, in Example 5, front crosstalk is not likely to occur as compared to Example 6. In addition, in Example 5, the thickness is larger than that of Example 6, and thus the distance between the display panel and the patterned optical anisotropic layer is shorter. Therefore, oblique crosstalk is not likely to occur, and the crosstalk viewing angle is improved.

As can be seen from the above results, the effects of the present invention are obvious.

EXPLANATION OF REFERENCES

10: optical laminate
14: transparent support
16: alignment film
18: patterned optical anisotropic layer
20: polarizing film
22: first phase difference region
24: second phase difference region
26: boundary region
50: 3D image display apparatus
52: display panel
54: right eye image display unit
56: left eye image display unit
58: black matrix
60: 3D image display system
62R: right circular polarization plate
62L: left circular polarization plate
C: interval between corner portions
a and b: in-plane slow axis direction
d: absorption axis
$\theta_1, \theta_2$: angle
B: table
M: mask
P: pressure
l: light
X: straight line
D: interval

What is claimed is:

1. An optical laminate comprising:
a patterned optical anisotropic layer; and
a polarizing film,
wherein the patterned optical anisotropic layer includes a first phase difference region and a second phase difference region having different in-plane slow axis directions and includes a boundary region positioned at a boundary between the first phase difference region and the second phase difference region,
the first phase difference region and the second phase difference region are alternately disposed in a first direction and a second direction perpendicular to the first direction, respectively, in the same plane,
an average width of the boundary region is 20 μm or less,
an average interval between corner portions of adjacent regions as a phase difference region having a smaller area among the first phase difference region and the second phase difference region is 4 μm to 60 μm, and
adjacent regions as a phase difference region having a larger area among the first phase difference region and the second phase difference region are connected to each other through corner portions.

2. The optical laminate according to claim 1,
wherein a total thickness of the optical laminate is 6 μm to 80 μm.

3. A method of manufacturing a patterned optical anisotropic layer including the optical laminate according to claim 1, the method comprising, in the following order:
an alignment film application step of applying a coating solution for forming an alignment film to a substrate to form a coating film;
an exposure step of performing pattern exposure on the coating film formed on the substrate using an exposure mask;
a rubbing step of rubbing the coating film on which the pattern exposure is performed to form the alignment film; and
a composition application step of applying a composition for forming the patterned optical anisotropic layer to the alignment film,
wherein in the exposure step, the exposure mask and the coating film are closely attached to each other and are pressed at a pressure of 0.03 MPa to 0.7 MPa for the exposure.

4. A method of manufacturing a patterned optical anisotropic layer including the optical laminate according to claim 2, the method comprising, in the following order:
an alignment film application step of applying a coating solution for forming an alignment film to a substrate to form a coating film;
an exposure step of performing pattern exposure on the coating film formed on the substrate using an exposure mask;
a rubbing step of rubbing the coating film on which the pattern exposure is performed to form the alignment film; and
a composition application step of applying a composition for forming the patterned optical anisotropic layer to the alignment film,
wherein in the exposure step, the exposure mask and the coating film are closely attached to each other and are pressed at a pressure of 0.03 MPa to 0.7 MPa for the exposure.

5. The optical laminate according to claim 1,
wherein the average interval between corner portions of adjacent regions as the phase difference region having the smaller area among the first phase difference region and the second phase difference region is 4 μm to 10 μm.

6. A method of manufacturing a patterned optical anisotropic layer including the optical laminate according to claim 5, the method comprising, in the following order:
an alignment film application step of applying a coating solution for forming an alignment film to a substrate to form a coating film;
an exposure step of performing pattern exposure on the coating film formed on the substrate using an exposure mask;
a rubbing step of rubbing the coating film on which the pattern exposure is performed to form the alignment film; and
a composition application step of applying a composition for forming the patterned optical anisotropic layer to the alignment film, wherein in the exposure step, the exposure mask and the coating film are closely attached to each other and are pressed at a pressure of 0.03 MPa to 0.7 MPa for the exposure.

7. A method of manufacturing a patterned optical anisotropic layer of an optical laminate having the patterned optical anisotropic layer and a polarizing film, wherein the patterned optical anisotropic layer includes a first phase difference region and a second phase difference region having different in-plane slow axis directions and includes a boundary region positioned at a boundary between the first phase difference region and the second phase difference region, the first phase difference region and the second phase difference region are alternately disposed in a first direction and a second direction perpendicular to the first direction, respectively, in the same plane, an average width of the boundary region is 20 µm or less, and an average interval between corner portions of adjacent regions as a phase difference region having a smaller area among the first phase difference region and the second phase difference region is 60 µm or less, the method comprising, in the following order:

an alignment film application step of applying a coating solution for forming an alignment film to a substrate to form a coating film;

an exposure step of performing pattern exposure on the coating film formed on the substrate using an exposure mask;

a rubbing step of rubbing the coating film on which the pattern exposure is performed to form the alignment film; and a composition application step of applying a composition for forming the patterned optical anisotropic layer to the alignment film, wherein in the exposure step, the exposure mask and the coating film are closely attached to each other and are pressed at a pressure of 0.03 MPa to 0.7 MPa for the exposure.

* * * * *